No. 778,768. PATENTED DEC. 27, 1904.
C. A. WORTHINGTON.
SHOE PROTECTOR FOR WHEEL TIRES.
APPLICATION FILED AUG. 24, 1904.

ATTEST:
C S Middleton
Edward L Reed

INVENTOR.
CLIFFORD A. WORTHINGTON.
Spear Middleton, Smalden & Spear
by
ATTY

No. 778,768. Patented December 27, 1904.

UNITED STATES PATENT OFFICE.

CLIFFORD ALBUNUS WORTHINGTON, OF TRENTON, NEW JERSEY.

SHOE-PROTECTOR FOR WHEEL-TIRES.

SPECIFICATION forming part of Letters Patent No. 778,768, dated December 27, 1904.

Application filed August 24, 1904. Serial No. 221,984.

*To all whom it may concern:*

Be it known that I, CLIFFORD ALBUNUS WORTHINGTON, a citizen of the United States, residing at Trenton, New Jersey, have invented certain new and useful Improvements in Shoe-Protectors for Tires of Automobiles and the Like, of which the following is a specification.

It is the object of my invention to provide a protector for tires of automobiles and the like in the form of a shoe composed of rubber and canvas molded into form to fit the tire at the place to be protected, where it is held by a lacing-cord passed through eyelets embedded in the composite material of which the protector is formed.

The invention consists in the combination and arrangement of parts hereinafter described, and particularly pointed out in the claims.

Figure 1:
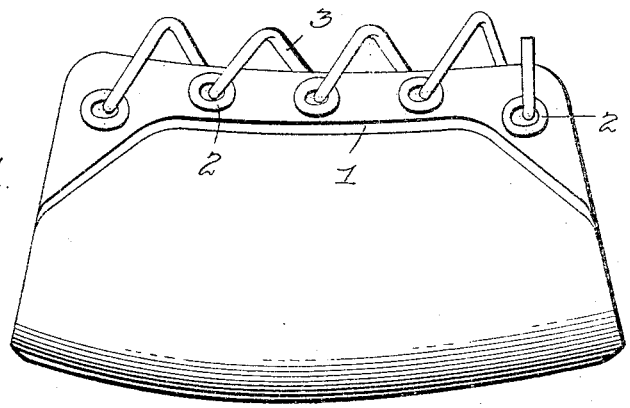
Figure 2:
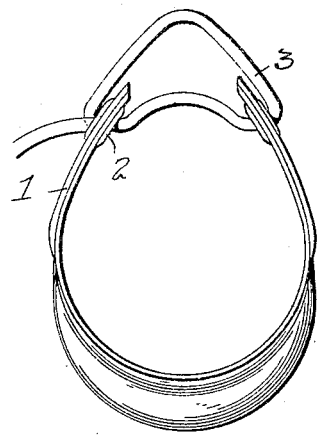
Figure 3:
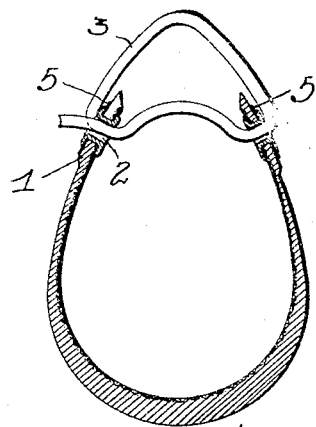

In the accompanying drawings, Figure 1 is a side view of the protector; Fig. 2, an end view, and Fig. 3 a sectional view.

In carrying out my invention I employ a composite material for the formation of a shoe or protector made up of rubber having incorporated therewith a layer or layers of fabric, and the said shoe or protector is formed by molding the material so that certain points may be made thicker than others, and thus provide for the additional wear or strain to which they are subjected in use.

The shoe or protector, for instance, is formed thickest at the tread portion and at the portion 1, where the eyelets 2 are located for receiving the lacing-cord 3.

In molding the protector the ends are rounded off, so that the front and rear edges will be comparatively thin and will lie close to the tire of the wheel, so as to offer no obstruction to the smooth running of the wheel. The molded thickened portion for the eyelets extends along the upper meeting edges of the protector, and at the end this thickened portion extends downwardly and tapers to the edges of the protector.

The shoe or protector is of substantially cylindrical form in cross-section, and its ends are cut so as to lie in the radial planes of the wheel. The fabric which is incorporated in the molded rubber may consist of one or more layers, and these are located in the inner side of the protector. The eyelets have broad flanges which grip the composite molded material on the outer and inner sides thereof, the said eyelets passing through both the rubber and the incorporated fabric. I find that with composite material of the character described the eyelets will be firmly held in place and are not liable to be pulled from the material, as is the case where eyelets are inserted in plain rubber or in a plain rawhide shoe or protector.

I reinforce with an extra thickness of cemented duck under each eyelet, as indicated at 5, which adds materially to the strength at these points. With a molded article of this character having reinforced or thickened portions at the desired points a shoe is provided which will maintain its shape against wrinkling or buckling, as the reinforced portions extending along the upper edges of the shoe and the thickened portions extending along the bottom will act as longitudinal bracing or sustaining means to hold the shoe against buckling, and by reason of the fact that the incorporated fabric is exposed on the inner side of the shoe the said shoe will securely grip the tire, and will thus aid the clamping effect of the lacing-cord to hold the shoe against slipping around the tire.

I claim as my invention—

1. A shoe-protector for automobile-tires formed of rubber and canvas molded into shape, and braced longitudinally by a thickened portion extending along the tread and thickened portion extending along each free edge and tapered downwardly along the end of the protector, the said ends being molded to a thin edge, and eyelets embedded in the reinforced longitudinal edges, the said canvas being exposed on the inner side of the shoe, substantially as described.

2. A protector or shoe for automobile-tires, formed of composite material molded into shape, and comprising an outside rubber portion and textile material incorporated therein, said textile material being exposed on the inner side of the shoe with eyelets inserted through the said composite material, substantially as described.

In testimony whereof I affix my signature in presence of two witnesses.

CLIFFORD ALBUNUS WORTHINGTON.

Witnesses:
    EDW. W. DAYMOND,
    CHAS. H. WILLIAMS.